United States Patent
Oomura et al.

(10) Patent No.: US 6,931,873 B2
(45) Date of Patent: Aug. 23, 2005

(54) VEHICLE AIR CONDITIONER

(75) Inventors: Mitsuyo Oomura, Hekinan (JP); Toshinobu Homan, Obu (JP); Hiroshi Kishita, Anjo (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/777,873

(22) Filed: Feb. 12, 2004

(65) Prior Publication Data

US 2004/0172959 A1 Sep. 9, 2004

(30) Foreign Application Priority Data

Feb. 12, 2003 (JP) ....................... 2003-033575

(51) Int. Cl.$^7$ .............. F25B 1/00; F25B 49/00; B60H 1/32
(52) U.S. Cl. ............ 62/228.4; 62/244; 62/296
(58) Field of Search ............... 62/228.1, 228.4, 62/228.5, 133, 244, 296

(56) References Cited

U.S. PATENT DOCUMENTS 5,950,440 A * 9/1999 Niimi et al. .................. 62/133
6,675,597 B2 * 1/2004 Ieda et al. ..................... 62/244
2004/0206102 A1 * 10/2004 Homan et al. ............. 62/228.1

FOREIGN PATENT DOCUMENTS

JP    A-H07-223428    8/1995

* cited by examiner

Primary Examiner—Marc Norman
(74) Attorney, Agent, or Firm—Harness, Dickey & Pierce, PLC

(57) ABSTRACT

In an air conditioner for a vehicle, when a target rotation speed of an electric compressor calculated by a target rotation speed calculating means is higher than an upper limit set by an upper limit setting means and a noise level is reduced from a level equal to or higher than a predetermined noise level to a level lower than the predetermined noise level, an inverter controls the compressor to stop for a predetermined period of time and subsequently increase rotation speed to the upper limit. Since the compressor is stopped for the predetermined period of time, the rotation speed of the compressor is controlled without detecting a rotational position of the compressor. Therefore, when the target rotation speed is higher than the upper limit and the noise level is decreased lower than the predetermined noise level, an actual rotation speed of the compressor is immediately decreased.

10 Claims, 6 Drawing Sheets

VEHICLE AIR CONDITIONER

CROSS-REFERENCE TO RELATED APPLICATION

This application is based on Japanese Patent Application No. 2003-33575 filed on Feb. 12, 2003, the disclosure of which is incorporated herein by reference.

FIELD OF THE INVENTION

The present invention relates to a vehicle air conditioner that controls the rotation speed of an electric compressor while performing air-conditioning operation of a compartment.

BACKGROUND OF THE INVENTION

In an air conditioner in which an air conditioning operation is performed by rotating an electric compressor, noise caused by the rotation of the compressor is likely to result in unpleasant noise for passengers, depending on a vehicle noise level.

For example, if the speed of a vehicle is equal to or higher than a predetermined speed, the vehicle noise level will be high because of road noises and the like. Therefore, the noise caused by the rotation of the compressor will less likely to affect the ear unpleasantly. On the other hand, if the vehicle speed is lower than the predetermined speed, the vehicle noise level will be low. In this case, therefore, the noise caused by the rotation of the compressor is likely to affect the ear unpleasantly.

To solve this problem, in an air conditioner disclosed in JP-A-7-223428, a necessary rotation speed of the electric compressor is calculated and the rotation speed of the compressor is controlled to the necessary rotation speed. Further, when the vehicle speed is equal to or lower than a predetermined level, the necessary rotation speed of the compressor is limited to a predetermined rotation speed even if the necessary rotation speed of the compressor is higher than the predetermined rotation speed.

In this air conditioner, the predetermined rotation speed of the compressor is for example set to 4000 rpm. It is calculated that the necessary rotation speed of the compressor is for example 7000 rpm, which is higher than the predetermined rotation speed. In this case, if the vehicle speed is changed from a level higher than the predetermined level to a level equal to or lower than the predetermined level, the rotation speed of the compressor is reduced from 7000 rpm to 4000 rpm.

On controlling a rotation speed of a motor of the compressor by a compressor rotation speed controlling means such as an inverter, the rotation speed of the motor is generally controlled by detecting a rotational position of a rotor of the motor. However, it takes time to detect the rotational position of the rotor. Therefore, it is difficult to immediately change the rotation speed of the rotor in a shorter time.

In fact, it is delayed to reduce the rotation speed of the compressor from 7000 rpm to 4000 rpm. That is, the rotation speed of the compressor is reduced after the vehicle speed is decreased lower than the predetermined speed and the vehicle noise level is lowered. Accordingly, the noise caused by the compressor is likely to remain, resulting in unpleasant noise for passengers in the compartment.

SUMMARY OF THE INVENTION

The present invention is made in view of the above matters, and it is an object of the present invention to provide a vehicle air conditioner that reduces unpleasant noise due to rotation of an electric compressor.

According to the present invention, an air conditioner for a vehicle includes an electric compressor, a target rotation speed calculating means, a noise level detecting means, an upper limit setting means, and a compressor rotation speed control means. The compressor is driven by receiving an electric power from a battery, which is mounted on the vehicle. The target rotation speed calculating means calculates a target rotation speed of the electric compressor. The noise level detecting means detects a noise level of the vehicle. The upper limit setting means sets an upper limit of the rotation speed of the compressor to a predetermined level when the detected noise level is lower than a predetermined noise level. The compressor rotation speed control means controls a rotation speed of the compressor based on one of the target rotation speed and the upper limit of the rotation speed, whichever is lower.

In the air conditioner, when calculated the target rotation speed is higher than the upper limit and the detected noise level is reduced from a level that is equal to or higher than the predetermined level to a level that is lower than the predetermined level, the compressor rotation speed control means controls the compressor to stop for a predetermined period of time and subsequently increase rotation speed to the upper limit.

Accordingly, the rotation speed of the compressor can be controlled by stopping the compressor for the predetermined period of time. It is not necessary to detect a rotational position of the compressor. Therefore, when the target rotation speed is higher than the upper limit and the noise level is reduced to the level lower than the predetermined noise level, an actual rotation speed of the compressor is immediately decreased. As a result, it is less likely that noise caused by the compressor will remain and result in unpleasant noise for passengers.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

Figure 1:
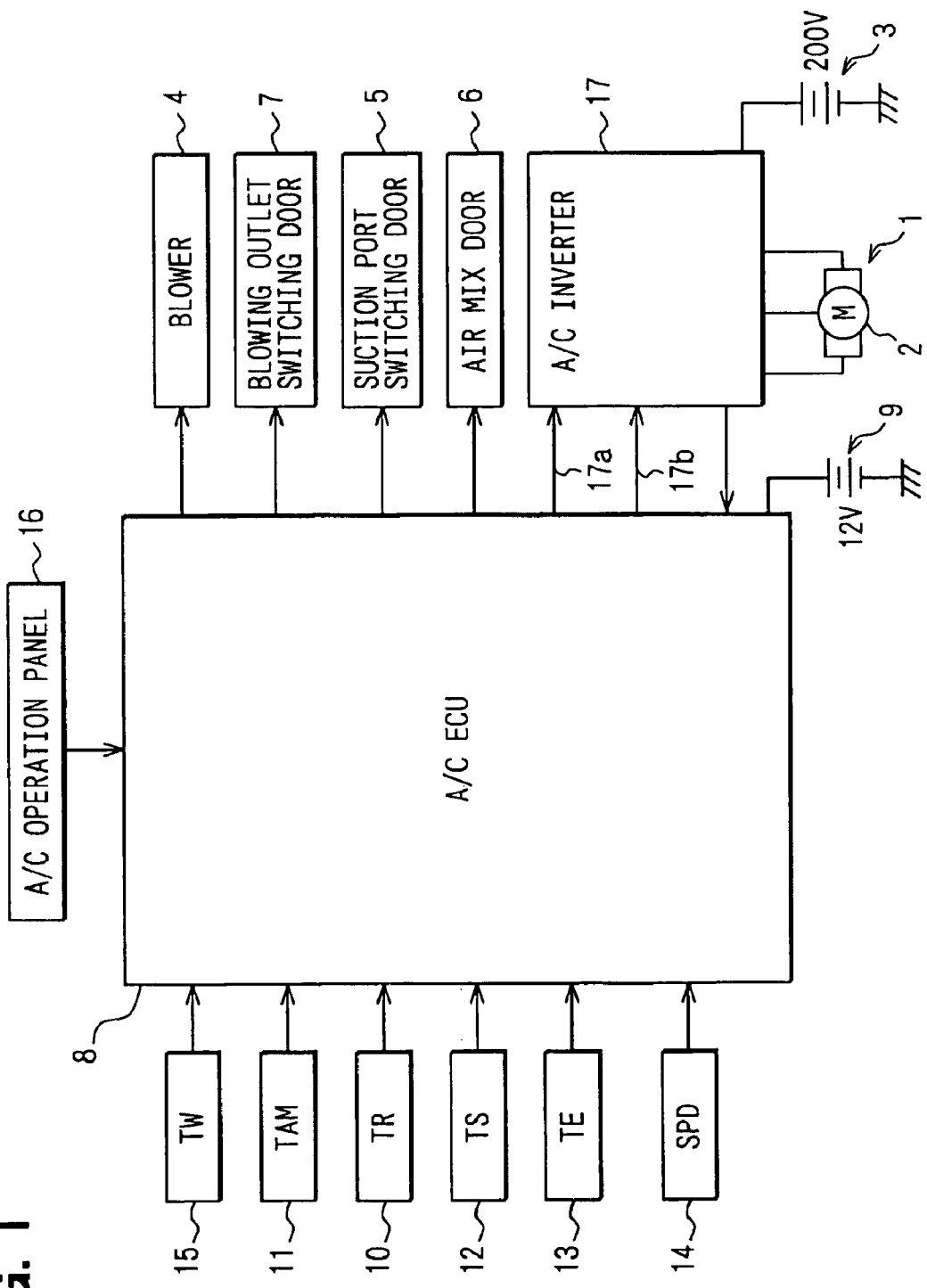
FIG. 1 is a block schematic diagram showing a control system of a vehicle air conditioner according to an embodiment of the present invention.

An air conditioner of the first embodiment is mounted on an electric vehicle. A control system of the air conditioner is shown in FIG. 1. The air conditioner includes a refrigerant cycle having a compressor 1. The compressor 1 is an electric compressor that is driven by an electric motor 2 mounted on the vehicle. The electric motor 2 is driven by receiving electric power from a battery 3 mounted on the vehicle.

The refrigerant cycle further includes, a condenser, a receiver, an expansion valve, and an evaporator. In the refrigerant cycle, a high-temperature, high-pressure refrigerant compressed by the electric compressor 1 is condensed in the condenser. The condensed liquid refrigerant is separated into gas refrigerant and liquid refrigerant in the receiver. Then, the liquid refrigerant from the receiver is decompressed and expanded through the expansion valve. Further, the low-temperature, low-pressure refrigerant expanded in the expansion valve is evaporated in the evaporator.

The air conditioner of the embodiment includes an air conditioning unit that supplies conditioning air into a passenger compartment. Regarding the air conditioning unit, a blower 4, the evaporator, a heater core, a suction port switching door 5, an air mix door 6, a blowing outlet switching door 7 and the like are provided in an air conditioner case. The suction port switching door 5 is provided to switch air suction modes between an inside air and an outside air. The air mix door 6 is provided to control temperature of the air to be blown into the passenger compartment. The blowing outlet switching door 7 is provided to open and close multiple air-blowing outlets through which air is blown toward a windshield, an upper half region of the compartment and a lower half region of the compartment.

Next, the control system of the air conditioner will be described.

The air conditioner has an air conditioner ECU 8 in which a CPU, a ROM, a RAM and the like are provided, as a computing means. When an ignition key, which is a vehicle switch, is turned on, electric power from a vehicle battery 9 is supplied to the air conditioner ECU 8, so the air conditioner ECU 8 is started.

The ECU 8 receives signals from various sensors such as an inside air temperature sensor 10, an outside air temperature sensor 11, a solar radiation sensor 12, an evaporator downstream temperature sensor 13, a vehicle speed sensor 14, a cooling water temperature sensor 15. The inside air temperature sensor 10 detects an inside air temperature Tr of the compartment. The outside air temperature sensor 11 detects an outside air temperature Tam. The solar radiation sensor 12 detects an amount Ts of solar radiation radiated to the inside of the compartment. The evaporator downstream temperature sensor 13 detects a temperature of air that has passed through the evaporator (hereafter, referred to as an evaporator downstream temperature Te). The vehicle speed sensor 14 detects a speed Spd of the vehicle. The cooling water temperature sensor 15 detects a temperature Tw of an engine cooling water, which provides a heat source to the heater core.

Further, the air conditioner ECU 8 receives signals from an air conditioner operation panel 16 provided on an instrument panel of the vehicle. The air conditioner operation panel 16 is provided with a temperature setting device for setting a target temperature of the compartment, an air conditioner switch that provides an instruction to start the electric compressor 1, and the like.

The air conditioner ECU 8 controls an operation of an inverter 17. The inverter 17 controls a rotation speed of the electric motor 2. Specifically, the air conditioner ECU 8 outputs a rotation speed indicating signal that indicates a rotation speed of the motor 2 to the inverter 17 through a second line 17b. Based on the rotation speed indicating signal, the inverter 17 controls the electric motor 2 so that the rotation speed of the electric motor 2 achieves the indicated rotation speed. Further, the air conditioner ECU 8 outputs an inverter-starting signal (inverter instruction signal) STB to the inverter 17 through a first line 17a, separately from the rotation indicated value signal. The inverter-starting signal STB enables and disables the operation of the inverter 17.

Figure 2:
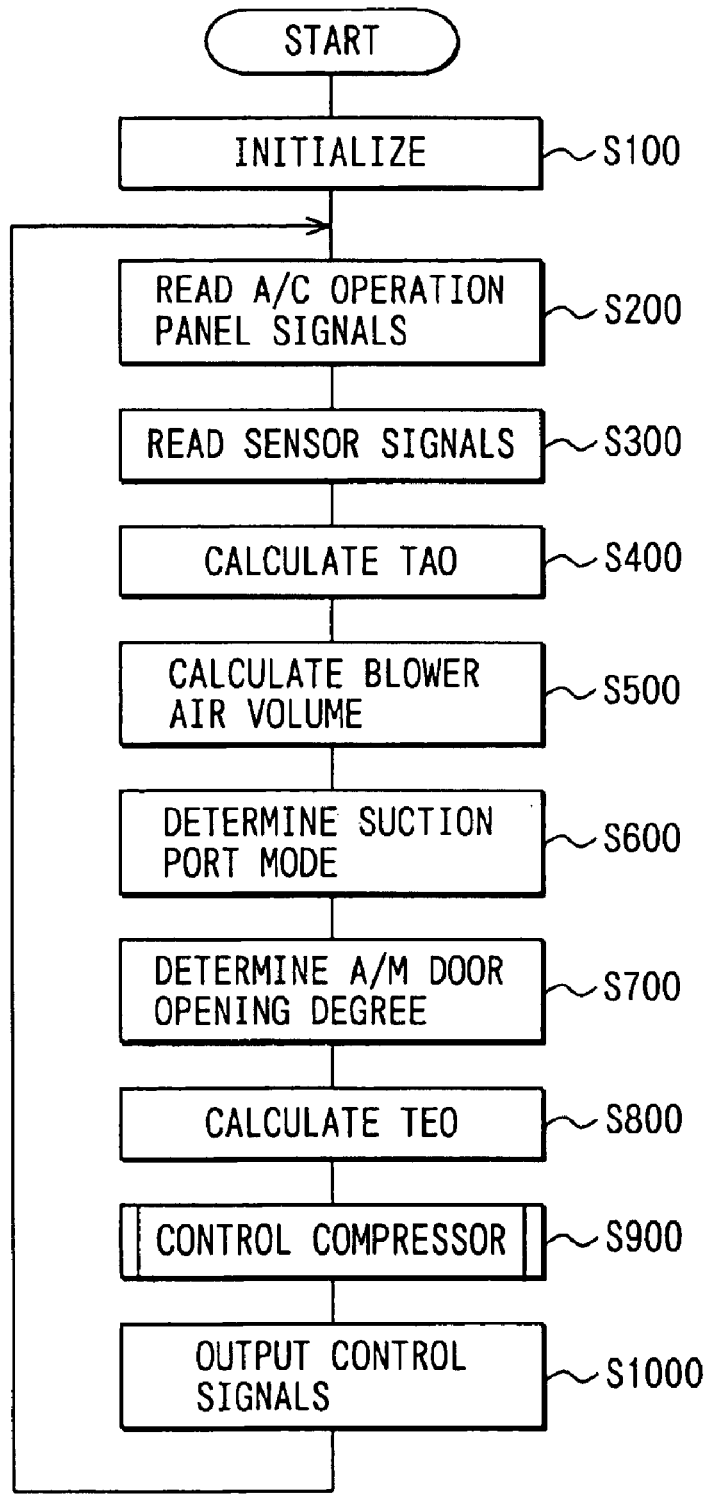
FIG. 2 is a flow chart of a control routine executed by an air conditioner ECU of FIG. 1.

Next, a control routine of the air conditioner ECU 8 will be described with reference to FIGS. 2 to 4. FIG. 2 shows a flow chart of the control routine executed by the air conditioner ECU 8. The routine is started when the ignition switch is turned on.

First, at a step S100, various setting values are initialized. Next, as a step S200, the ECU 8 reads signals from the operation panel 16. At a step S300, the ECU 8 reads signals from the sensors 10 to 15. Then, at a step S400, a target blowing air temperature Tao is calculated based on the setting temperature Tset, the outside air temperature Tam, the inside air temperature Tr and the solar radiation amount Ts.

At a step S500, an air volume of the blower is calculated, based on the target blowing air temperature Tao. Further, at a step S600, the suction port mode is determined based on the target blowing air temperature Tao. At a step S700, the opening degree of the air mix door 6 is calculated based on the target blowing air temperature Tao. At a step S800, a target evaporator downstream temperature Teo, which is a target value of the evaporator downstream temperature Te, is calculated based on the target blowing air temperature Tao. Then, at a step S900, the electric compressor 1 is controlled based on flow charts of FIGS. 3 and 4. Thereafter, actuators such as servomotors for driving the blower 4, the suction port switching door 5, the air mix door 6, the blowing outlet switching door 7 are driven based on the values that are calculated and determined at the steps S500 to S800.

Figure 3:
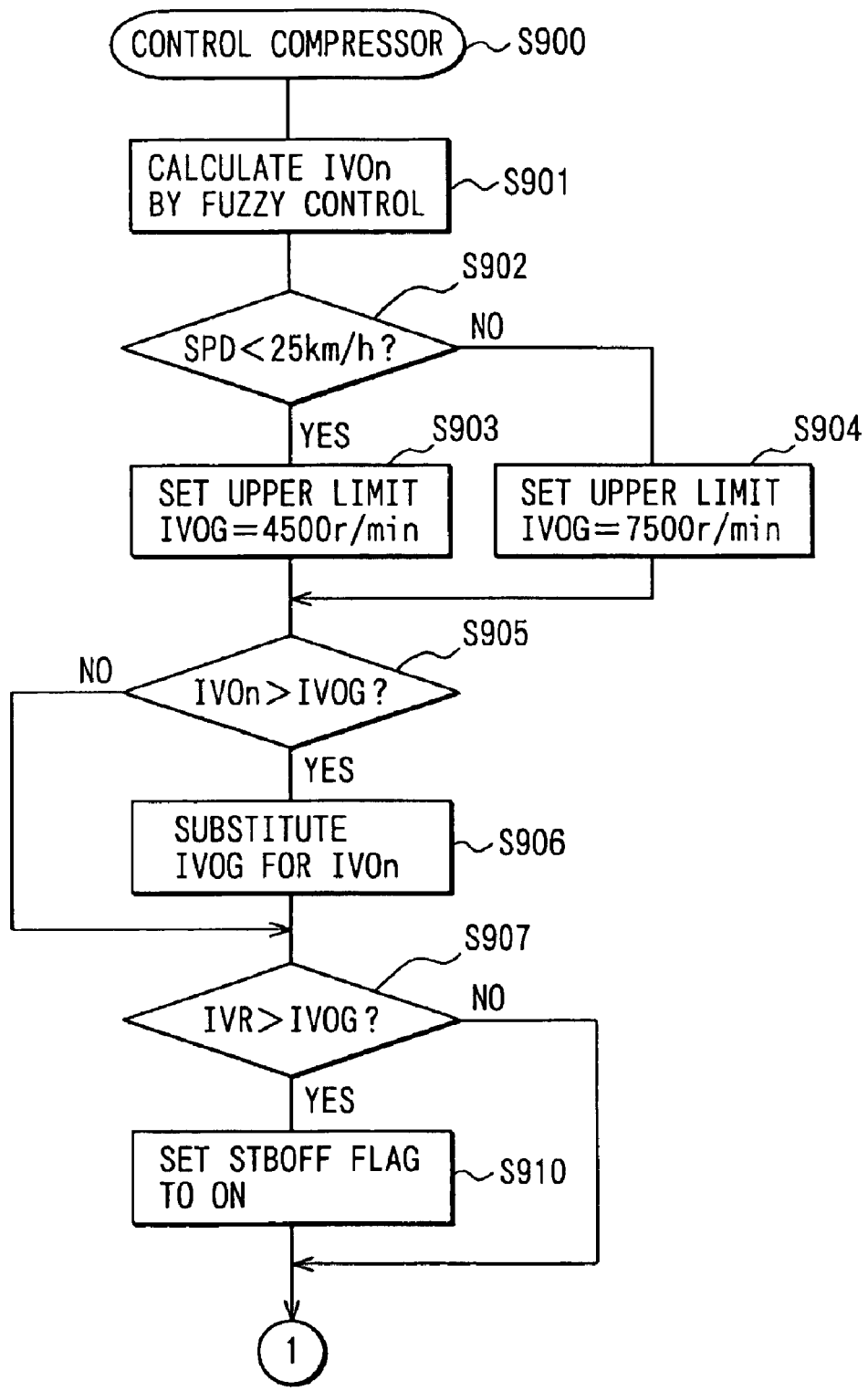
FIG. 3 is a flow chart showing detailed steps in the control of an electric compressor of FIG. 2.
Figure 4:
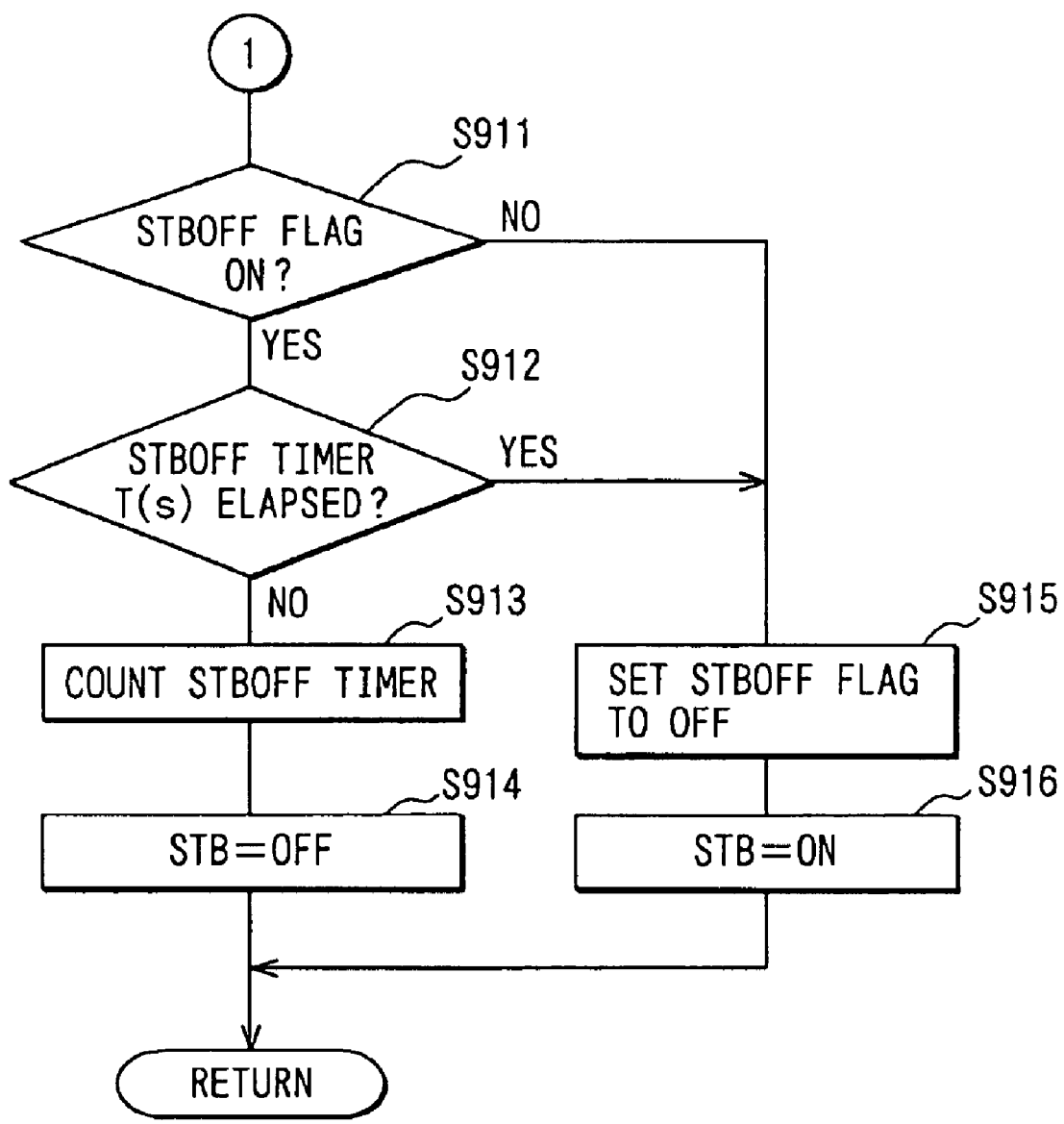
FIG. 4 is a flow chart showing detailed steps in the control of the electric compressor of FIG. 2.

Specifically, the electric compressor 1 is controlled in a manner shown in the flow charts of FIGS. 3 and 4. Basically, a well-known fuzzy control is executed so that the evaporator downstream temperature Te achieves the target evaporator downstream temperature Teo. Then, the rotation speed of the compressor 1 is controlled by the inverter 17 based on the instruction from the air conditioner ECU 8.

First, at a step S901, a target rotation speed IVOn of the electric compressor 1 is calculated based on the fuzzy control. The step S901 provides a target rotation speed calculating means. Next, when a vehicle noise level, which is detected by the vehicle noise level detecting means 14, is lower than a predetermined level, an upper limit IVOG of the rotation speed of the electric compressor 1 is set to a predetermined level. In the embodiment, the vehicle noise level is for example determined based on the vehicle speed detected by the vehicle speed sensor 14. The vehicle speed sensor 14 provides the vehicle noise level detecting means.

Specifically, at a step S902, it is determined whether the vehicle speed Spd is lower than a predetermined level (for example, 25 km/h). If it is determined that the vehicle speed Spd is lower than the predetermined level, the upper limit IVOG is set to a first upper limit (for example, 4500 rpm) at a step S903. Here, the steps S902 and S903 provide an upper limit setting means.

If it is determined that the vehicle speed Spd is equal to or higher than the predetermined level, the upper limit IVOG is set to a second upper limit (for example, 7500 rpm) at a step S904. When the vehicle speed is high (for example, Spd≧25 km/h), road noises and vibrations of the vehicle are large. Even if the compressor 1 is operated at high rotation speed, operation noise and vibration of the compressor 1 are less likely to exert an effect on passengers. Accordingly, the second upper limit is set such that the compressor 1 is operated at high rotation speeds.

On the other hand, when the vehicle speed is low (for example, Spd<25 km/h), road noises and vibrations of the vehicle are small. Therefore, if the compressor 1 is operated at high rotation speed, the operation noise and vibrations of the compressor 1 are likely to exert an effect on the passengers. In this case, therefore, the first upper limit is set so that the compressor 1 is operated at low rotation speed. That is, the second upper limit is higher than the first upper limit.

Next, the rotation of the compressor 1 is controlled based on one of the target rotation speed IVOn calculated at the step S901 and the upper limit IVOG set at the step S903, whichever is lower (Steps S905, S906). Specifically, it is determined whether the target rotation speed IVOn is higher than the upper limit IVOG at a step S905. If it is determined that the target rotation speed IVOn is higher than the upper limit IVOG, the upper limit IVOG is substituted for the target rotation speed IVOn. The steps S905 and S906 provide a rotation speed controlling means.

Next, at a step S907, it is determined whether the upper limit IVOG is lower than an actual rotation speed IVR of the compressor 1. If it is determined that the upper limit IVOG is lower than the actual rotation speed IVR, a STBOFF flag is set to ON so that the inverter starting signal STB is stopped.

For example, when the vehicle decelarates from the high speed to the low speed while the compressor 1 is operated at 7500 rpm, the upper limit IVOG is reduced from 7500 rpm to 4500 rpm, and the target rotation speed IVOn is limited to 4500 rpm. At this time, if the actual rotation speed IVR is still at the same speed as that when the vehicle speed is high, it is necessary to reduce the rotation speed of the compressor 1 immediately. At the step S907, it is determined whether it is necessary to immediately reduce the rotation speed of the compressor 1. If it is determined necessary, the STBOFF flag is set to ON.

Next, when the STBOFF flag is ON, the inverter starting signal STB is not transmitted during a predetermined period of time T (second), so that the operation of the inverter 17 is disabled for the predetermined period of time T. By this, the electric compressor 1 halts for a predetermined period of time (steps S911 to S916). If the predetermined period of time T is too short, the inverter 17 will erroneously determine the STBOFF signal as noise, resulting in a malfunction. Therefore, it is preferable to set the predetermined period of time T to a period such that the STBOFF signal is properly determined.

Specifically, it is determined whether the STBOFF flag is set to ON at a step S911. If it is determined that the STBOFF signal is ON, it is determined whether the predetermined period of time T has been elapsed after the TSBOFF flag is set to ON, at a step S912. If it is determined that the predetermined period of time T has not been elapsed, a TSBOFF timer starts to count a STBOFF time at a step S913. Thus, at a step S914, the inverter starting signal STB is kept in OFF, so the inverter 17 is disabled to start the operation.

If it is determined that the predetermined period of time T has been elapsed at the step S912, the STBOFF flag is set to OFF at a step S915. Thus, at a step S916, the inverter starting signal STB is transmitted, so the inverter 17 is enabled to start the operation.

Accordingly, in order to immediately reduce the rotation speed of the compressor 1 to the low level, the starting of the inverter 17 is disabled by stopping the inverter starting signal STB for the predetermined period of time T. By this, the rotation of the compressor 1 can be controlled without requiring the detection of a rotational position of the compressor 1.

Figure 5:
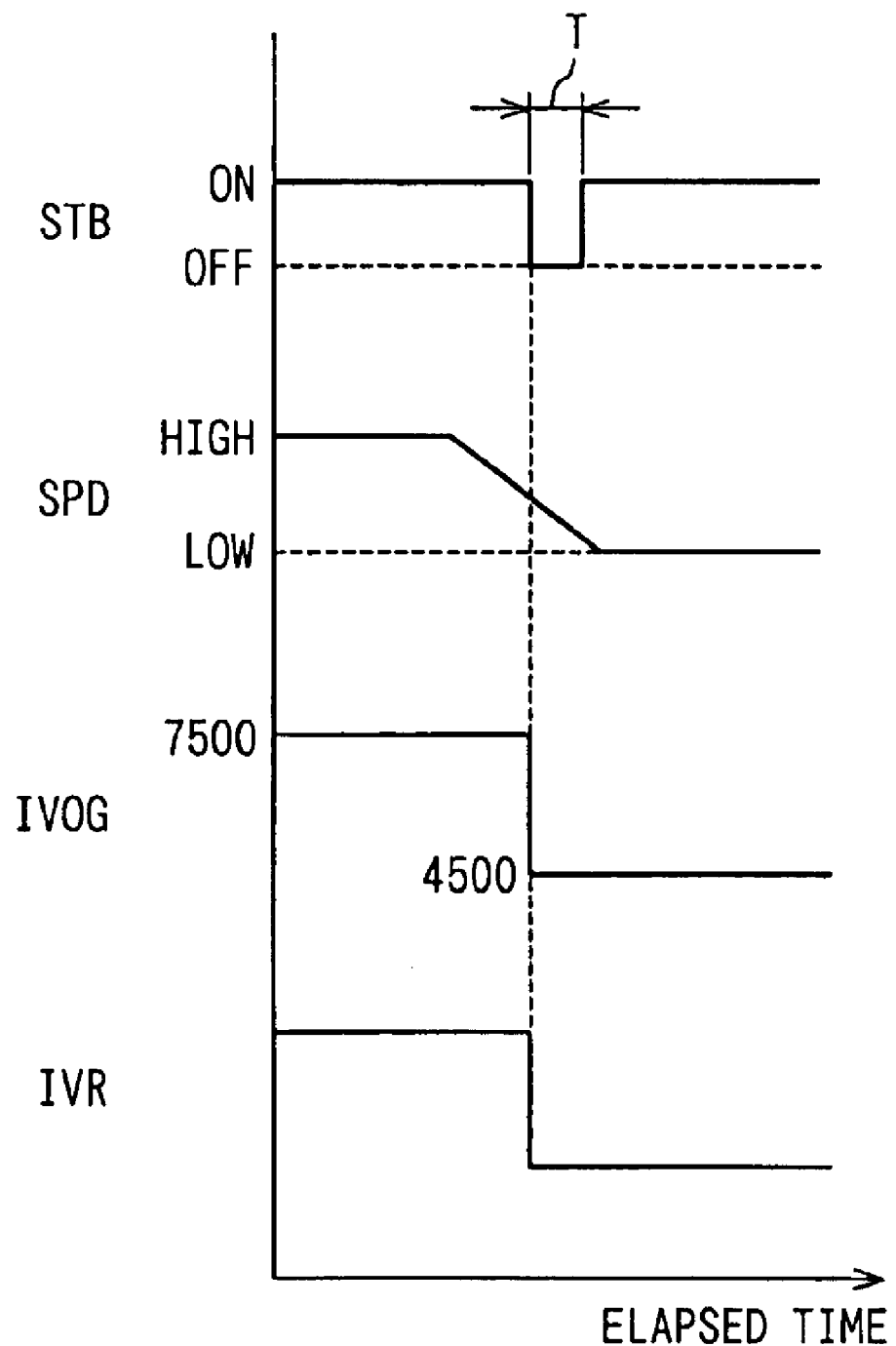
FIG. 5 is a time chart showing operations by controls of FIGS. 3 and 4.

Specifically, as shown in FIG. 5, when the target rotation speed IVOn is higher than the upper limit IVOG, if the case that the vehicle noise level is decreased from the level that is equal to or higher than the predetermined level (Spd≧25 km/h) to the level that is lower than the predetermined level (Spd<25 km/h), the inverter starting signal STB is stopped for the predetermined period of time T. Accordingly, the actual rotation speed IVR of the electric compressor 1 can be immediately decreased. Therefore, it is less likely that the noise caused by the rotation of the compressor 1 will remain and will result in unpleasant noise for the passengers. After the predetermined period of time T has elapsed, the operation of the inverter 17 is enabled, so the rotation speed of the compressor 1 is increased to the predetermined upper level subsequently.

If the predetermined period of time T is too short, an effect to immediately decrease the rotation speed of the compressor 1 will be low. On the contrary, if the predetermined period of time T is too long, it will increase a time required to rise the rotation speed of the compressor 1 to the upper limit IVOG after the rotation speed of the compressor 1 is immediately decreased to the low level. This may deteriorate air conditioning feeling. In view of these issues, it is preferable to set the predetermined period of time T.

Figure 6:
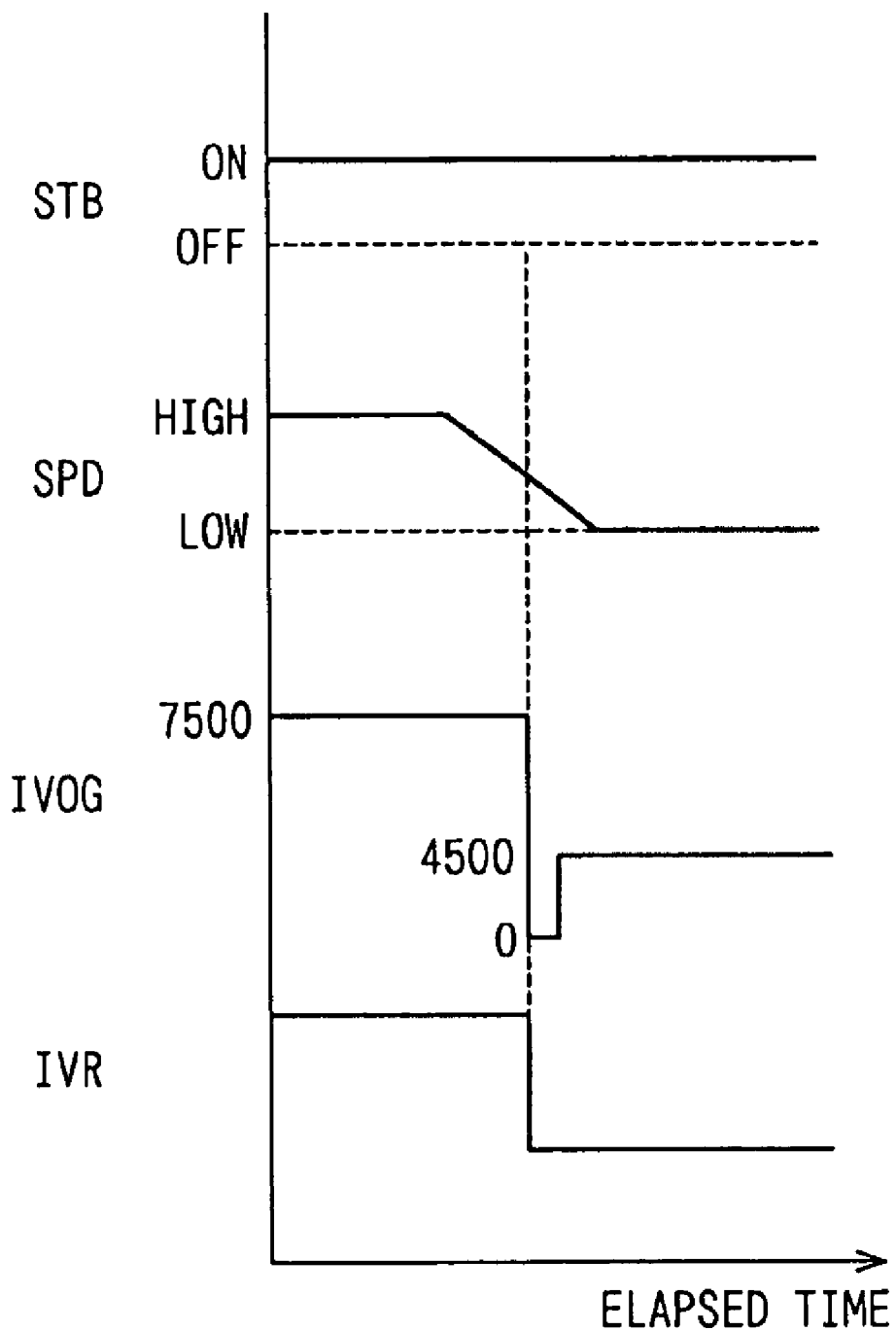
FIG. 6 is a time chart showing operations of an air conditioner according to a second embodiment of the present invention.

FIG. 6 shows a second embodiment of the present invention. To immediately decrease the rotation speed of the compressor 1 to the low level, as shown in FIG. 6, the value of the rotation speed indicating signal, which is outputted to the inverter 17 from the air conditioner ECU 8, is set to zero for the predetermined period of time T while maintaining the inverter starting signal STB on.

Similar to the first embodiment shown in FIG. 5, the rotation speed of the compressor 1 can be controlled by setting the rotation speed of the rotation speed indicating signal to zero for the predetermined period of time T. Therefore, it is necessary to detect the rotational position of the compressor 1. When the target rotation speed IVOn is higher than the upper limit IVOG and the vehicle noise level is reduced from the level that is equal to or higher than the predetermined level (Spd≧25 km/h) to the level that is lower than the predetermined level (Spd<25 km/h), the value of the rotation speed indicating signal is set to zero for the predetermined period of time T. Therefore, the actual rotation speed IVR of the compressor 1 can be immediately decreased. Accordingly, it is less likely that the noise caused by the rotation of the compressor 1 will remain and will result in unpleasant noise for the passengers. After the predetermined period of time T has elapsed, the value of the rotation speed indicating signal is set to the predetermined upper level.

In the first and second embodiments, it is determined that the vehicle noise level is lower than the predetermined level when the vehicle running speed is lower than the predetermined speed, because the vehicle noise level increases in accordance with the vehicle speed. That is, the vehicle noise level is determined based on the vehicle speed. Alternatively, the vehicle sound level can be determined based on the volume of air blown by the blower 4, because the vehicle noise level increases in accordance with the volume of air blown by the blower 4. Therefore, at step S902, it can be determined that the vehicle noise level is lower than the predetermined level when the volume of air blown by the blower 4 is lower than a predetermined level.

In this case, for example, a sensor for detecting the volume of air blown by the blower 4 is provided, and the detected value is sent to the air conditioner ECU 8 in signal. Thus, the sensor provides the vehicle noise level detecting means, in place of or together with the speed sensor 14.

The present invention should not be limited to the disclosed embodiment, but may be implemented in other ways without departing from the spirit of the invention.

What is claimed is:

1. An air conditioner for a vehicle comprising:

an electric compressor;

a target rotation speed calculating means that calculates a target rotation speed of the electric compressor;

a noise level detecting means that detects a noise level of the vehicle;

an upper limit setting means that sets an upper limit of a rotation speed of the compressor to a predetermined value when the detected noise level is lower than a predetermined noise level; and a compressor rotation speed control means for controlling a rotation speed of the compressor based on one of the calculated target rotation speed and the upper limit of the rotation speed, whichever is lower, wherein when the target rotation speed is higher than the upper limit and the detected noise level is reduced from a level that is equal to or higher than the predetermined level to a level that is lower than the predetermined level, the compressor rotation speed control means controls the electric compressor to stop for a predetermined period of time and subsequently increase rotation speed to the upper limit.

2. The air conditioner according to claim 1, wherein the noise level detecting means determines that the noise level is lower than the predetermined noise level when a vehicle speed is lower than a predetermined speed.

3. The air conditioner according to claim 2, further comprising a first line that electrically connects the target rotation speed calculating means and the compressor rotation speed control means, wherein the compressor rotation speed control means receives an operation instruction signal that enables and disables operation of the compressor rotation speed control means through the first line, wherein the operation of the compressor is stopped for the predetermined period of time by disabling the operation of the compressor rotation speed control means for a predetermined period of time by the operation instruction signal.

4. The air conditioner according to claim 2, further comprising a second line that electrically connects the target rotation speed calculating means and the compressor rotation speed control means, wherein the compressor rotation speed control means receives a rotation speed indicating signal that indicates the target rotation speed through the second line, wherein the rotation of the compressor is stopped for the predetermined period of time by indicating that the target rotation speed is zero for a predetermined period of time by the rotation speed indicating signal.

5. The air conditioner according to claim 1, further comprising an air-blowing device for blowing air into a passenger compartment of the vehicle, wherein the noise level detecting means determines that the noise level is lower than the predetermined noise level when a volume of air blown by the air-blowing device is lower than a predetermined volume.

6. The air conditioner according to claim 5, further comprising a first line that electrically connects the target rotation speed calculating means and the compressor rotation speed control means, wherein the compressor rotation speed control means receives an operation instruction signal that enables and disables operation of the compressor rotation speed control means through the first line, wherein the operation of the compressor is stopped for the predetermined period of time by disabling the operation of the compressor rotation speed control means for a predetermined period of time by the operation instruction signal.

7. The air conditioner according to claim 5, further comprising a second line that electrically connects the target rotation speed calculating means and the compressor rotation speed control means, wherein the compressor rotation speed control means receives a rotation speed indicating signal that indicates the target rotation speed through the second line, wherein the rotation of the compressor is stopped for the predetermined period of time by indicating that the target rotation speed is zero for a predetermined period of time by the rotation speed indicating signal.

8. The air conditioner according to claim 1, further comprising a first line that electrically connects the target rotation speed calculating means and the compressor rotation speed control means, wherein the compressor rotation speed control means receives an operation instruction signal that instruct to enable and disable operation of the compressor rotation speed control means through the first line, wherein the operation of the compressor is stopped for the predetermined period of time by disabling the operation of the compressor rotation speed control means for a predetermined period of time by the operation instruction signal.

9. The air conditioner according to claim 1, further comprising a second line that electrically connects the target rotation speed calculating means and the compressor rotation speed control means, wherein the compressor rotation speed control means receives a rotation speed indicating signal that indicates the target rotation speed through the second line, wherein the rotation of the compressor is stopped for the predetermined period of time by indicating that the target rotation speed is zero for a predetermined period of time by the rotation speed indicating signal.

10. The air conditioner according to claim 1, further comprising a battery mounted on the vehicle, wherein the battery provides electric power to the electric compressor.

* * * * *